June 5, 1962  H. W. PATTON  3,038,114
AUTOMATIC PILOT CONTROL EQUIPMENT
Original Filed Sept. 13, 1956  3 Sheets-Sheet 1

INVENTOR.
HENRY W. PATTON
BY
ATTORNEY

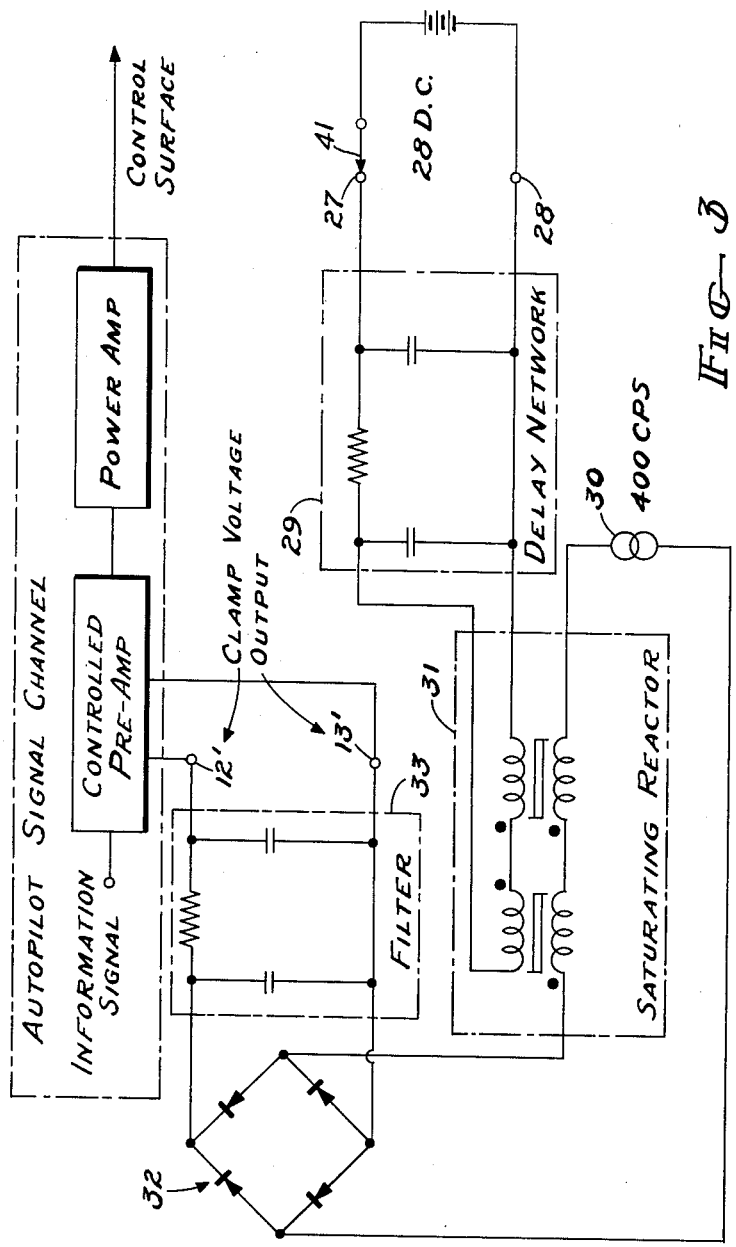

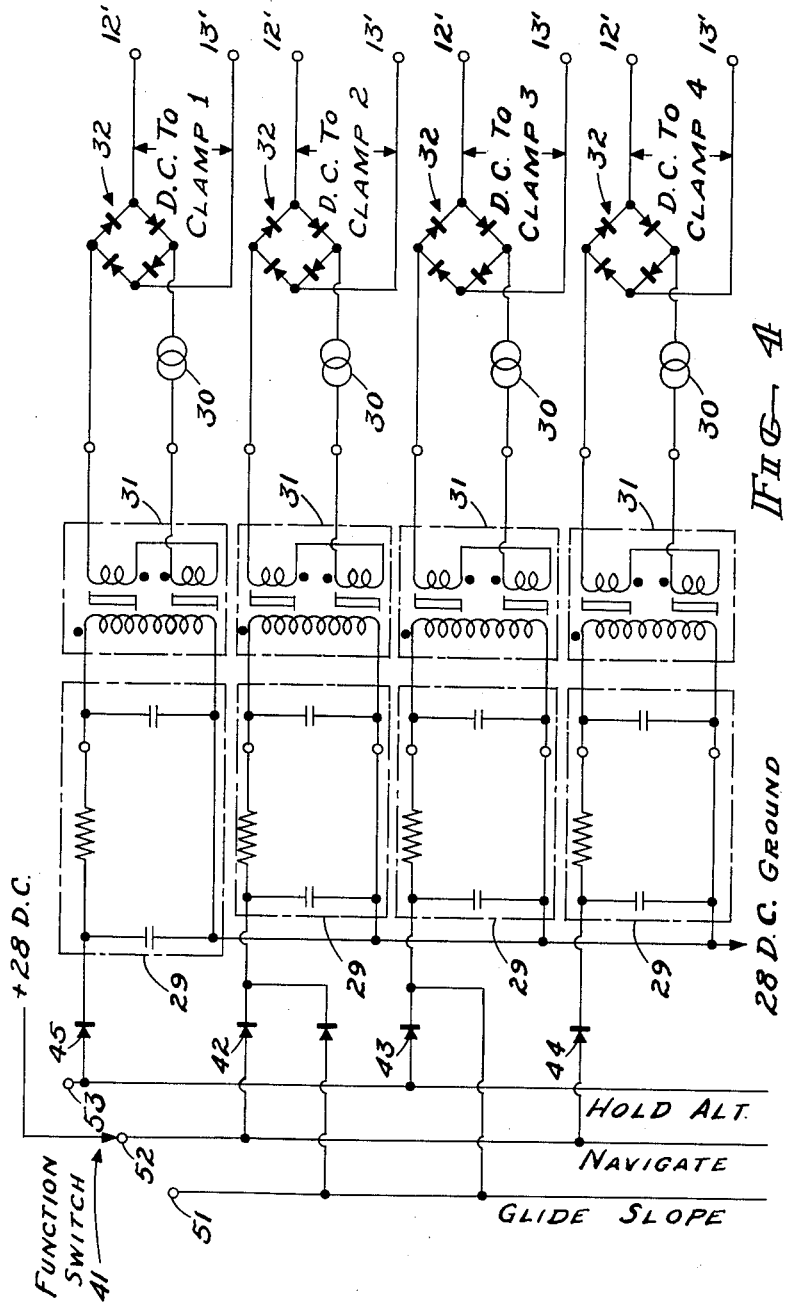

United States Patent Office 3,038,114
Patented June 5, 1962

3,038,114
AUTOMATIC PILOT CONTROL EQUIPMENT
Henry W. Patton, Cedar Rapids, Iowa, assignor to Collins Radio Company, Cedar Rapids, Iowa, a corporation of Iowa
Original application Sept. 13, 1956, Ser. No. 609,720. Divided and this application Apr. 22, 1959, Ser. No. 818,496
3 Claims. (Cl. 323—89)

This invention relates to automatic pilot flight control equipment and more specifically to such equipment for changing flight control functions without generating disturbing transient effects. The present invention relates to a clamping control circuit for an amplifier, subject matter of which is divided from my copending application Serial No. 609,720, filed September 13, 1956.

In automatic flight control equipment, it is often desired to switch from one flying function to another, such as from "glide slope" to "gyro" and to "hold altitude" flight functions. The switching of the control of the aircraft from one of these flight functions to another must be done smoothly or, as it is sometimes said, one function must be "faded" into another. This fading is required to prevent undesired violent maneuvers of the aircraft during the changing of flight functions. This invention provides an amplifier circuit which is controlled by a clamp circuit to limit the amplification of the amplifier. The system is controlled by a direct current potential applied to saturable reactors in conjunction with alternating current supply signals. The alternating current output of the saturable reactors is applied to a rectifier circuit, the output of which is filtered and applied to the amplifier to control its gain. Thus, the direct current applied to the saturable reactor controls the flight functions by causing the total gain of the signal amplifier to vary.

It is a feature of this invention that automatic flight control equipment is controlled both as to its gain and as to the rapidity of its total energization or gain by the application of a direct current voltage. It is a further feature of this invention that automatic flight control equipment may be smoothly switched from one flight function to another without generating disturbing transient effects to disrupt flight of the aircraft.

It is an object of this invention to provide a control system for automatic flight control systems which will enable the pilot to engage the automatic pilot system and to change the flight functions of the system without generating disturbing transients to noticeably affect the flight of the aircraft. It is another object of this invention to provide a control system for an automatic flight control system which is economical to construct, simple, and essentially fail-proof. It is a still further object of this invention to provide a control system for automatic pilot systems where one switch controls several operating channels, such as aileron, rudder, etc. It is still another object to provide a control system which will enable the pilot to switch operating functions from one to another easily and simply with no separate control necessary to minimize the transient effects of the change.

These and other objects of this invention will become apparent when the following description is read in conjunction with the accompanying drawings, in which:

FIGURE 3 is a schematic representation of this invention applied to a single autopilot signal channel; and FIGURE 4 is a schematic representation of this invention applied to a plurality of signal channels for flight functions.

Figure 1:
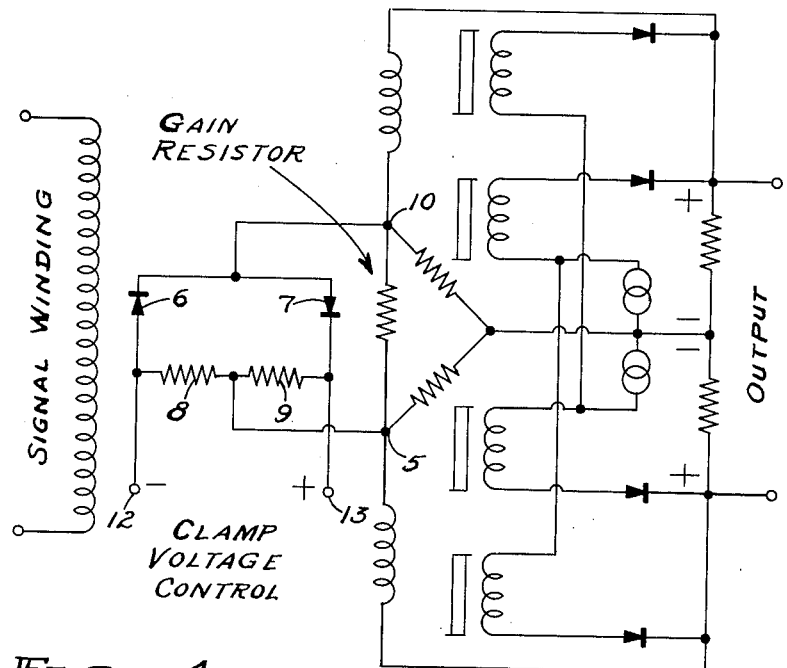
FIGURE 1 is a diagram of one embodiment of an amplifier circuit of this invention.
Figure 2:
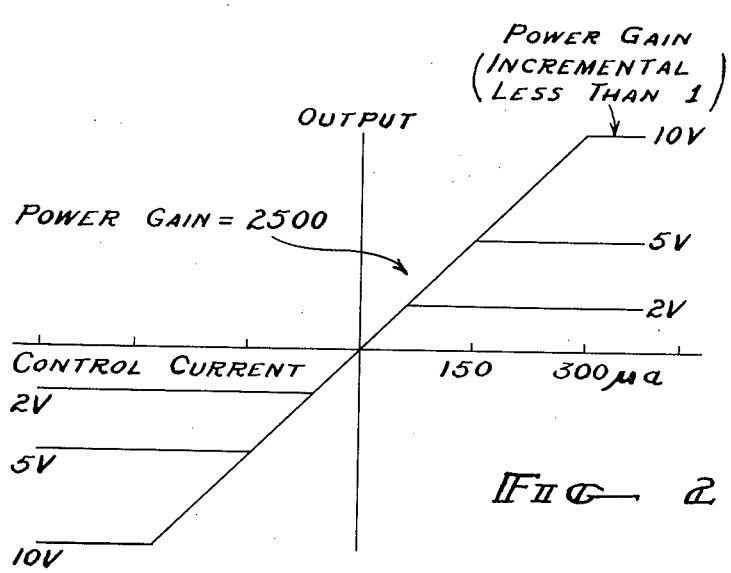
FIGURE 2 is a graphical representation of the gain characteristics of the amplifier of FIGURE 1 with various clamp voltages applied.

Referring now to FIGURE 1, this amplifier circuit has accurate gain control characteristics which are controlled by the impedance across terminals 5 and 10. This amplifier is well known in the art and controls its gain by negative feedback means. The amplifier utilizes core materials having an essentially rectangular hysteresis characteristic. The addition of the diodes 6 and 7 and the resistors 8 and 9 to the well-known negative feedback amplifier provides novel clamp means to control the gain of the amplifier circuit. With no direct current voltage applied to the clamp circuit, diodes 6 and 7 effectively provide a short-circuit across terminals 10 and 5, which results in substantially zero gain by the amplifier. The amount of gain of the amplifier is changed immediately upon the application of a direct current voltage of the clamp circuit. A direct current voltage applied to the clamp circuit of either polarity unblocks the diodes 6 and 7 so that full gain is exhibited by the amplifier circuit. Full gain is maintained in the amplifier circuit until the output signal potential across the output resistors reaches one-half of the applied direct current clamp voltage. At this point, the potential applied to the diodes 6 and 7 in the clamp circuit will reverse polarity and this reduces the gain of the magnetic amplifier to zero once more. The gain control characteristics of the amplifier circuit of FIGURE 1 with various values of clamp voltage, namely 2, 5, and 10 volts, are shown in FIGURE 2. It is obvious from FIGURE 2 that the operating characteristics and the maximum gain characteristics may be accurately controlled by controlling the amount of direct current clamp voltage applied to the amplifier of this invention.

Referring now to FIGURE 3, which depicts a novel circuit for generating the direct current voltage for application to the amplifier of FIGURE 1, terminals 27 and 28 are connected through a switch 41 to a direct current source which is applied through a delay network 29 to a saturating reactor 31. The A.C. windings of the saturating reactor 31 are connected to an alternating current source 30 which aboard aircraft normally has a frequency of 400 cycles per second. The saturation characteristics of the saturating reactor 31 are thus directly controlled by the direct current applied to the windings of the reactor. The output circuit of the saturating reactor is connected to a diode bridge 32. The other side of the bridge is connected to the filter network 33 for filtering before application to the terminals 12' and 13' which may be connected to like terminals 12 and 13 of the clamp circuit of FIGURE 1. The controlled preamplifier of FIGURE 3 may be an amplifier such as that shown in FIGURE 1. The information input signal to the controlled preamplifier is a control signal for operating the rudder, ailerons, etc. of the aircraft, and the output signal from the controlled preamplifier is applied directly or after mixing with other information signals to a power amplifier; thence to a control surface.

Referring now to FIGURE 4, a plurality of circuits similar to that of FIGURE 3 are arranged so that one function switch on the aircraft can control the flight of the aircraft so as to fly in any one of a plurality of functions. The switching of the function switch 41 to contacts 51, 52, or 53 obviously will apply a direct current signal through diodes 42, 43, 44, or 45 to a plurality of filter delay networks 29 and then to a plurality of saturable reactors 31 in exactly the same fashion as that described for FIGURE 3. The outputs of the rectifier bridges 32 in FIGURE 4 are then applied to clamps 1, 2, 3, or 4, which are connected to predetermined preamplifiers by appropriate filters so as to control the flight of the aircraft in the function directed by the switch 41. With the switch 41 in the position shown in FIGURE 4, current will pass through diodes 42 and 44 to the respective saturable reactors 31. The outputs of the saturable reactors 31 are supplied through the delay network 29. The saturable reactors will generate an output current which will be applied to the respective rectifier bridge circuits 32 and the respective filter networks 33 and so a signal is applied to the clamp of amplifier 2 and amplifier 4. Thus the amplifiers 2 and 4 connected to clamps 2 and 4 will have a voltage applied and these amplifiers will be permitted to amplify. This amplification results as described for FIGURE 1 by the unblocking of the amplifiers by application of the direct current voltage. These amplifiers then will amplify to a given value dependent upon the gain characteristics of the amplifier and the amount of direct current voltage applied, this direct current voltage being controllable by the amount of direct current applied to the saturating reactor. It is particularly important to note that only one switch, 41, is required for all the switching functions in this automatic pilot system. This invention also eliminates many relays and contacts required in prior inventions. This invention also provides for fading time to be automatically inserted by the delay filters 29 so that any generated transient effects are smoothed out. Thus this invention switches flight control from one flight function to a new flight function smoothly. The various amplifiers required for this invention are connected as shown in FIGURE 4 for integration purposes and it is to be remembered that each output from the filters 33 in FIGURE 4 is applied to the clamp circuit of a particular preamplifier as shown in FIGURES 1 and 3. Thus, this invention provides a method for smoothly switching flight functions, but no attempt is made herein to describe the automatic pilot system required, or the complete integration of the signals from gyro and glide slope, etc. This integration is accomplished in other circuitry in most automatic pilot systems and it is not necessary that it be described to explain the operation of this invention.

Although this invention has been described with respect to a particular embodiment thereof, it is not to be so limited, as changes and modifications may be made therein which are within the full intended scope of the invention, as defined by the appended claims.

What is claimed is:

1. In a magnetic amplifier of the type including a plurality of saturable core members each having associated therewith an input signal control winding, a power winding, and a feedback winding, and a gain controlling resistive network serially and symmetrically connected with said feedback windings and the output terminals of said amplifier; means for controlling the gain of said amplifier, said means including said resistive network and further comprising first and second unilateral conduction devices serially connected in opposite polarization with first and second resistive members respectively, each said serially connected unilateral device and resistive member connected across the terminals of said gain controlling resistive network, a source of direct-current voltage connected between the junctions of each of said unilateral conduction devices and the associated one of said first and second resistors, said direct-current source being polarized with the positive and negative terminals thereof connected to the cathode and anode electrodes respectively of said unilateral conduction devices, whereby said amplifier is rendered conductive by and the output of said amplifier is limited at a predetermined magnitude in accordance with the presence of and the magnitude respectively of said source of direct current.

2. An amplifier gain control circuit comprising switching means, a source of direct current voltage, a delay network connectable to said source of direct current voltage through said switching means, a saturable reactor including a control winding and an output winding, said control winding connected to the output of said delay network, a source of alternating current voltage, full wave rectifying means including an input and an output, the output winding of said saturable reactor serially connected with said alternating current voltage source and the input to said rectifying means, a filter network connected to the output of said rectifying means, an input information signal source, a magnetic amplifier including a plurality of saturable core members each having associated therewith an input signal control winding to which said input information signal source is connected, a power winding, and a feedback winding, and a gain controlling resistive network serially and symmetrically connected with said feedback windings and the output terminals of said amplifier, direct-current voltage responsive-gain-control means including said resistive network and further comprising first and second unilateral conduction devices serially connected in opposite polarization with first and second resistive members respectively, each said serially connected unilateral device and resistive member connected across the terminals of said gain controlling resistive network; the output of said filter network connected between the junctions of each of said unilateral conduction devices and the associated one of said first and second resistors, said filter network output being polarized with the positive and negative terminals thereof connected to the cathode and anode electrodes respectively of said first and second unilateral conduction devices, whereby said amplifier is selectively rendered conductive by, and the output of said amplifier is limited at, a predetermined magnitude in accordance with the presence of and the magnitude respectively of the output of said filter network.

3. An amplifier gain control circuit comprising a selection switch, a source of direct current voltage, a delay network connectable to said source of direct current voltage through said selection switch, a saturable reactor having a control winding and an output winding with said control winding connected to said delay network, a source of alternating current voltage, one side of said alternating voltage source connected to one end of the output winding of said saturable reactor, a diode bridge rectifier circuit including pairs of input and output terminals, one input terminal of said diode bridge circuit connected to the other end of the output winding of the saturable reactor, the other input terminal of said diode bridge rectifier connected to the other side of the alternating current voltage source, a filter network connected to the output terminals of the diode bridge rectifier, a source of information signals; a magnetic amplifier including a plurality of saturable core members each having associated therewith an input signal control winding to which said source of information signals is connected, a power winding, and a feedback winding, and a gain controlling resistive network serially and symmetrically connected with said feedback windings and the output terminals of said amplifier, direct-current voltage responsive-gain-control means including said resistive network and further comprising first and second unilateral conduction devices serially connected in opposite polarization with first and second resistive members respectively, each said serially connected unilateral device and resistive member connected across the terminals of said gain controlling resistive network, said selection switch selectively connecting said source of direct current voltage to said delay means thereby effecting a predetermined saturation in said reactor, said diode bridge circuit being adapted to produce a direct current output signal with magnitude proportional to the degree of saturation of said reactor, the output of said filter network connected between the junctions of each of said unilateral conduction devices and the associated one of said first and second resistors, said filter network output being polarized with the positive and negative terminals thereof connected to the cathode and anode electrodes respectively of said first and second unilateral conduction devices, whereby said amplifier is rendered conductive by and the output of said amplifier is limited at a predetermined magnitude in accordance with the presence of and the magnitude respectively of said filter network output.

References Cited in the file of this patent

UNITED STATES PATENTS

| | | |
|---|---|---|
| 2,473,617 | Stiefel | June 21, 1945 |
| 2,518,865 | Cartotto | Apr. 15, 1950 |
| 2,631,268 | Ramson et al. | Mar. 10, 1953 |
| 2,700,130 | Geyger | Jan. 18, 1955 |